(12) United States Patent
Raghavan et al.

(10) Patent No.: US 11,581,961 B2
(45) Date of Patent: Feb. 14, 2023

(54) NETWORK ASSISTED ANTENNA CALIBRATION

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 59 days.

(21) Appl. No.: 17/304,084

(22) Filed: Jun. 14, 2021

(65) Prior Publication Data

US 2021/0391928 A1 Dec. 16, 2021

Related U.S. Application Data

(60) Provisional application No. 63/039,912, filed on Jun. 16, 2020.

(51) Int. Cl.
*H04B 17/00* (2015.01)
*H04B 17/21* (2015.01)

(52) U.S. Cl.
CPC .................................. *H04B 17/21* (2015.01)

(58) Field of Classification Search
CPC ........ H04B 17/11; H04B 17/12; H04B 17/21; H04B 17/24
See application file for complete search history.

(56) References Cited

U.S. PATENT DOCUMENTS

| 8,923,370 | B2 * | 12/2014 | Johansson | ................ | H04B 1/40 |
| | | | | | 375/219 |
| 9,277,501 | B2 * | 3/2016 | Lorenz | ............. | H04W 52/0245 |
| 10,965,026 | B2 * | 3/2021 | Kimball | ................ | H01Q 3/267 |

* cited by examiner

*Primary Examiner* — Tuan Pham
(74) *Attorney, Agent, or Firm* — Harrity & Harrity LLP/Qualcomm Incorporated

(57) ABSTRACT

Various aspects of the present disclosure generally relate to wireless communication. In some aspects, a wireless communication device may transmit a set of reference signals to an assisting device; and receive, from the assisting device, a set of feedback signals corresponding to the set of reference signals, wherein the set of feedback signals is to facilitate calibration of at least one antenna element on at least one panel associated with the wireless communication device. Numerous other aspects are provided.

30 Claims, 7 Drawing Sheets

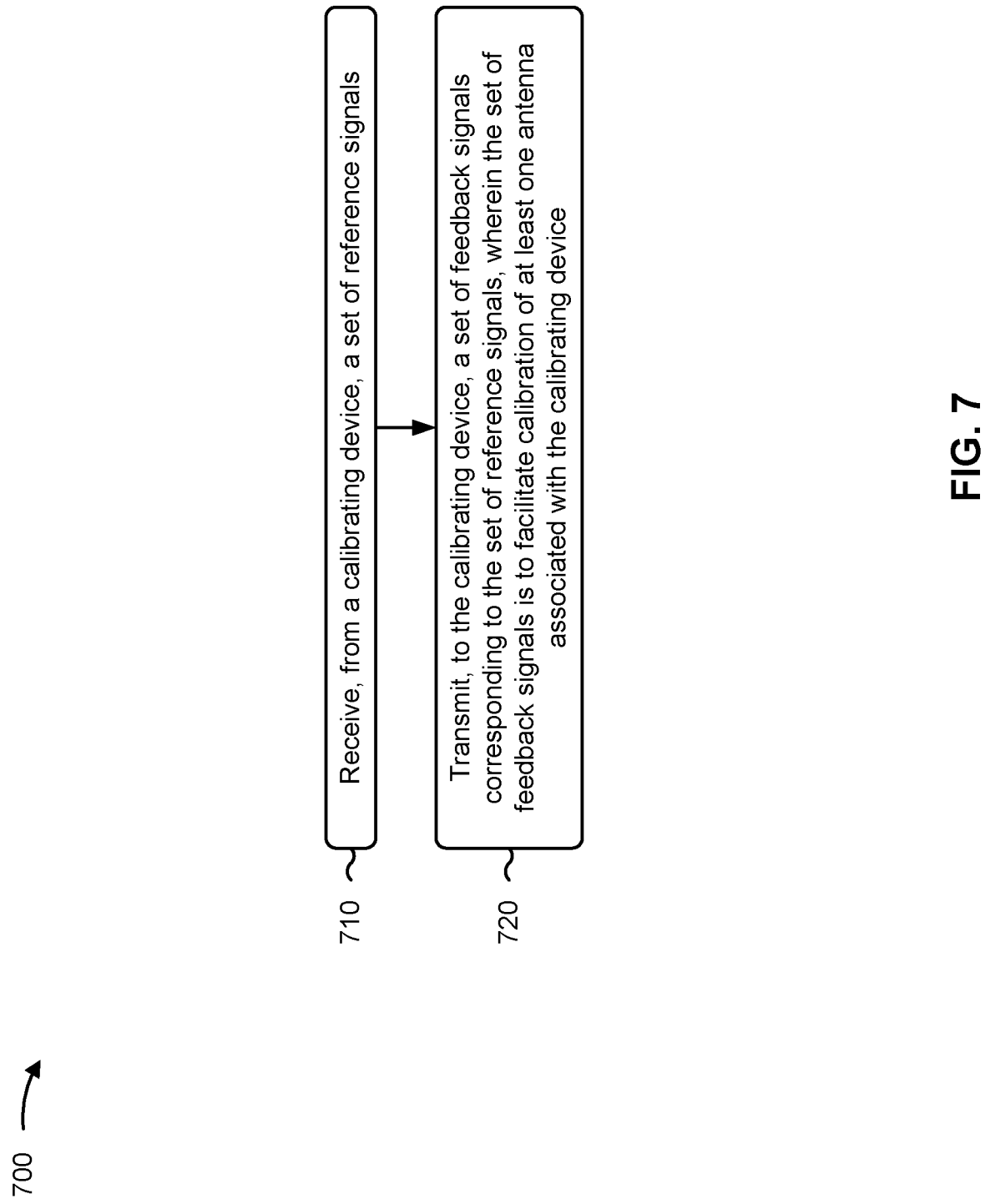

NETWORK ASSISTED ANTENNA CALIBRATION

CROSS-REFERENCE TO RELATED APPLICATION

This patent application claims priority to U.S. Provisional Patent Application No. 63/039,912, filed on Jun. 16, 2020, entitled "NETWORK ASSISTED ANTENNA CALIBRATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for network assisted antenna calibration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a wireless communication device includes transmitting a set of reference signals to an assisting device; and receiving, from the assisting device, a set of feedback signals corresponding to the set of reference signals, wherein the set of feedback signals is to facilitate mission-mode calibration of a phase and an amplitude of at least one antenna element on at least one panel associated with the wireless communication device.

In some aspects, a method of wireless communication performed by a wireless communication device includes receiving, from a calibrating device, a set of reference signals; and transmitting, to the calibrating device, a set of feedback signals corresponding to the set of reference signals, wherein the set of feedback signals is to facilitate mission-mode calibration of a phase and an amplitude of at least one antenna element on at least one panel associated with the calibrating device.

In some aspects, a wireless communication device for wireless communication includes a memory, a transceiver, and one or more processors, coupled to the memory and to the transceiver, configured to: transmit, via the transceiver, a set of reference signals to an assisting device; and receive, via the transceiver, from the assisting device, a set of feedback signals corresponding to the set of reference signals, wherein the set of feedback signals is to facilitate mission-mode calibration of a phase and an amplitude of at least one antenna element on at least one panel associated with the wireless communication device.

In some aspects, a wireless communication device for wireless communication includes a memory, a transceiver, and one or more processors, coupled to the memory and to the transceiver, configured to: receive, via the transceiver, from a calibrating device, a set of reference signals; and transmit, via the transceiver, to the calibrating device, a set of feedback signals corresponding to the set of reference signals, wherein the set of feedback signals is to facilitate mission-mode calibration of a phase and an amplitude of at least one antenna element on at least one panel associated with the calibrating device.

In some aspects, a non-transitory computer-readable medium storing a set of instructions for wireless communication includes one or more instructions that, when executed by one or more processors of a wireless communication device, cause the wireless communication device to: transmit a set of reference signals to an assisting device; and receive, from the assisting device, a set of feedback signals corresponding to the set of reference signals, wherein the set of feedback signals is to facilitate mission-mode calibration of a phase and an amplitude of at least one antenna element on at least one panel associated with the wireless communication device.

In some aspects, a non-transitory computer-readable medium storing a set of instructions for wireless communication includes one or more instructions that, when executed by one or more processors of a wireless communication device, cause the wireless communication device to: receive, from a calibrating device, a set of reference signals; and transmit, to the calibrating device, a set of feedback signals corresponding to the set of reference signals, wherein the set of feedback signals is to facilitate mission-mode calibration of a phase and an amplitude of at least one antenna element on at least one panel associated with the calibrating device.

In some aspects, an apparatus for wireless communication includes means for transmitting a set of reference signals to an assisting device; and means for receiving, from the assisting device, a set of feedback signals corresponding to the set of reference signals, wherein the set of feedback signals is to facilitate mission-mode calibration of a phase and an amplitude of at least one antenna element on at least one panel associated with the wireless communication device.

In some aspects, an apparatus for wireless communication includes means for receiving, from a calibrating device, a set of reference signals; and means for transmitting, to the calibrating device, a set of feedback signals corresponding to the set of reference signals, wherein the set of feedback signals is to facilitate mission-mode calibration of a phase and an amplitude of at least one antenna element on at least one panel associated with the calibrating device.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6-7 are diagrams illustrating example processes associated with network assisted antenna calibration, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
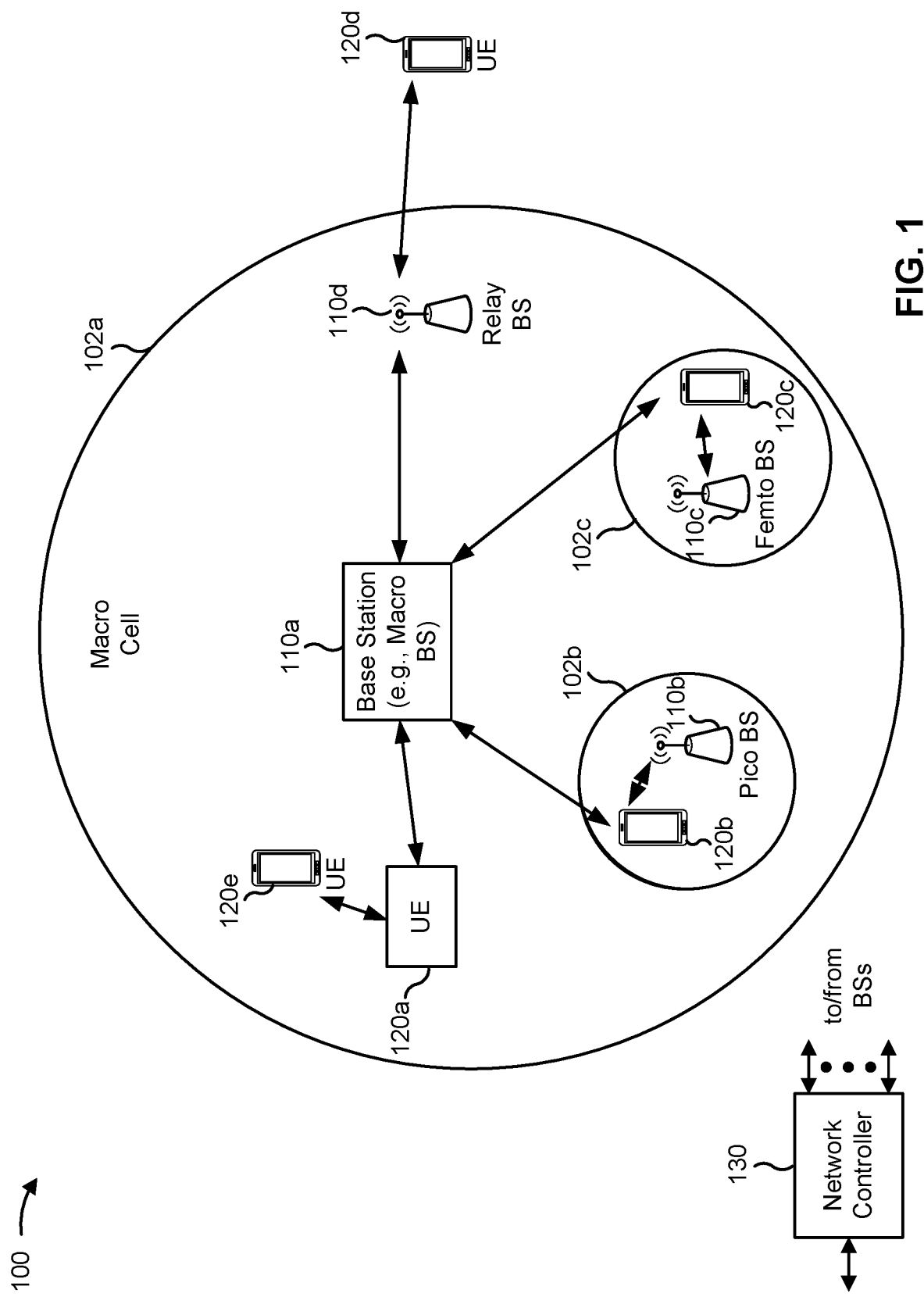
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
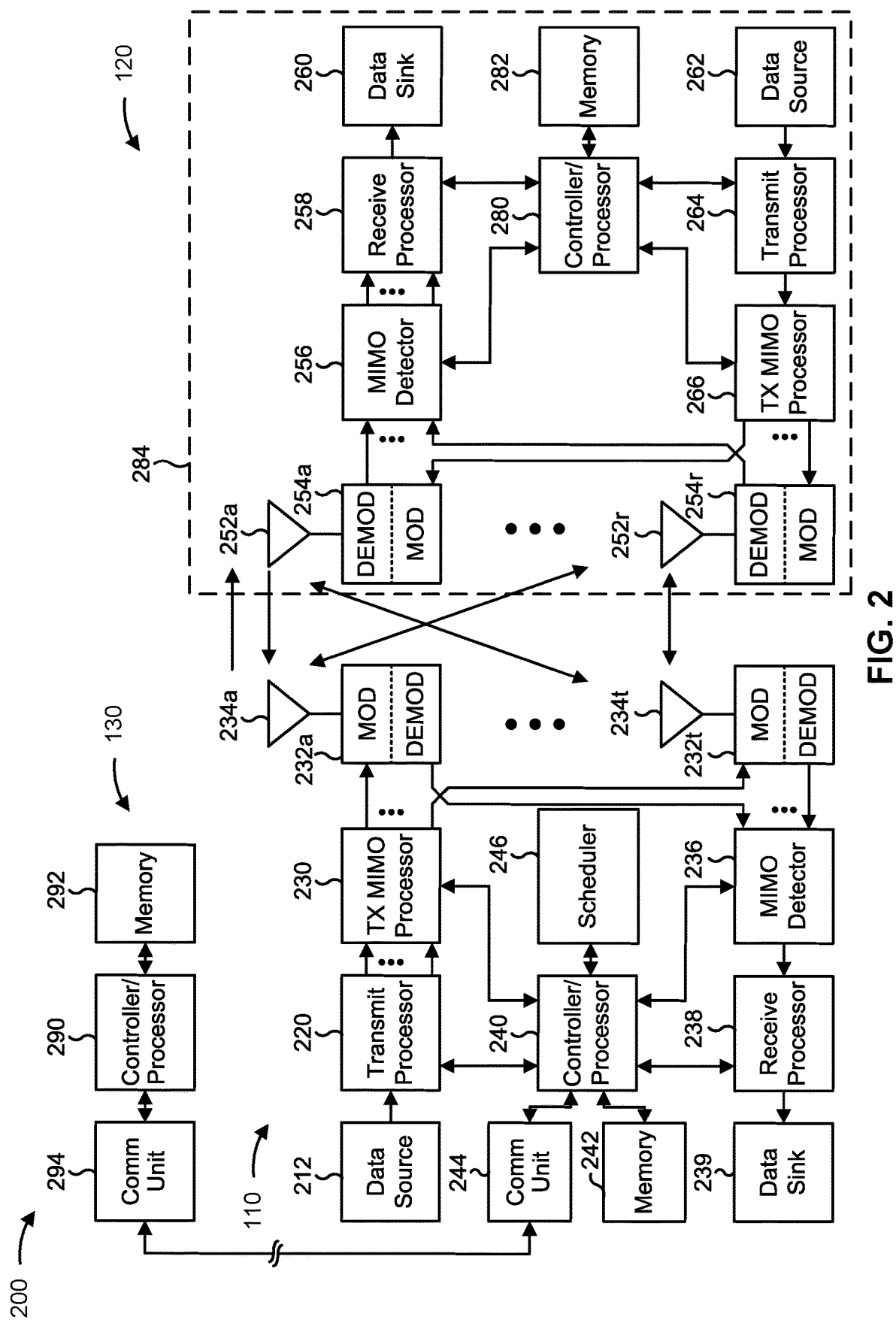
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-7). For example, where a processor and memory of the UE are configured to transmit or to receive, it is understood that the processor and the memory may be configured to transmit or receive via the transceiver.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-7). For example, where a processor and memory of the BS are configured to transmit or to receive, it is understood that the processor and the memory may be configured to transmit or receive via the transceiver.

Controller/processor 240 of base station 110, controller/processor 280 of UE 120, and/or any other component(s) of FIG. 2 may perform one or more techniques associated with network assisted antenna calibration, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, a wireless communication device (e.g., the base station 110, the UE 120, and/or the like) may include means for transmitting a set of reference signals to an assisting device (e.g., using controller/processor 240, controller/processor 280, transmit processor 220, transmit processor 264, TX MIMO processor 230, TX MIMO processor 266, MOD 232, MOD 254, antenna 234, antenna 252, memory 242, memory 282, and/or the like), means for receiving, from the assisting device, a set of feedback signals corresponding to the set of reference signals, wherein the set of feedback signals is to facilitate calibration of at least one antenna element on at least one panel associated with the wireless communication device (e.g., using antenna 234, using antenna 252, DEMOD 232, DEMOD 254, MIMO detector 236, MIMO detector 256, receive processor 238, receive processor 258, controller/processor 240, controller/processor 280, memory 242, memory 282, and/or the like), and/or the like.

In some aspects, a wireless communication device (e.g., the base station 110, the UE 120, and/or the like) may include means for receiving, from a calibrating device, a set of reference signals (e.g., using antenna 234, using antenna 252, DEMOD 232, DEMOD 254, MIMO detector 236, MIMO detector 256, receive processor 238, receive processor 258, controller/processor 240, controller/processor 280, memory 242, memory 282, and/or the like), means for transmitting, to the calibrating device, a set of feedback signals corresponding to the set of reference signals, wherein the set of feedback signals is to facilitate calibration of at least one antenna element on at least one panel associated with the calibrating device (e.g., using controller/processor 240, controller/processor 280, transmit processor 220, transmit processor 264, TX MIMO processor 230, TX MIMO processor 266, MOD 232, MOD 254, antenna 234, antenna 252, memory 242, memory 282, and/or the like), and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Beamforming may be used in NR implementations to facilitate coherently combining energy and overcoming high path losses observed at higher frequencies. This may be particularly useful with millimeter wave communications. To assist with signaling, beamforming weights for receiving communications may be computed based on antennas of UEs and/or CPEs. The weights calculated for receiving may not be reused for transmission since the radio frequency (RF) hardware and processing is different than the RF hardware and processing for receiving communications.

Some typical approaches include performing a self-test and calibrating each antenna and each RF chain (receive chain, transmit chain, and/or the like) separately. This approach may result in unnecessary consumption of processing resources and/or time resources, particularly when used during mission-mode operation. Mission-mode operation is a mode of operation in which the device is deployed (e.g., in-field) for wireless communication with other wireless devices. For example, a wireless device in mission-mode operation may be configured to transmit and/or receive data and/or control communications in accordance with an intended purpose of the device. Mission-mode operation also includes the sleep-wake up cycles in which the device operates to enable power savings. In other words, mission-mode operation corresponds to any operation that is beyond the factory mode. Self-testing and calibration also may introduce calibration errors that can lead to loss in beamforming performance, and also resulting in higher latency to mitigate these losses. In some cases, larger codebook sizes may be used, but this may result in higher latency, power consumption, thermal, and/or the like.

According to aspects of techniques and apparatuses described herein, an assisted calibration procedure may be used to facilitate antenna calibration. As a result, costly self-testing and calibrating may be reduced or avoided, thus facilitating conservation of processing resources, reduction of latency, and/or the like. In some aspects, a wireless communication device may transmit a set of reference signals to an assisting device. The assisting device may transmit a set of feedback signals to the wireless communication device. The wireless communication device may use the feedback signals to facilitate calibration of antenna elements. In this way, calibration error may be reduced, leading to better beamforming performance, which may result in reduced latency, higher throughput, reduction in consumption of processing resources, and/or the like.

Figure 3:
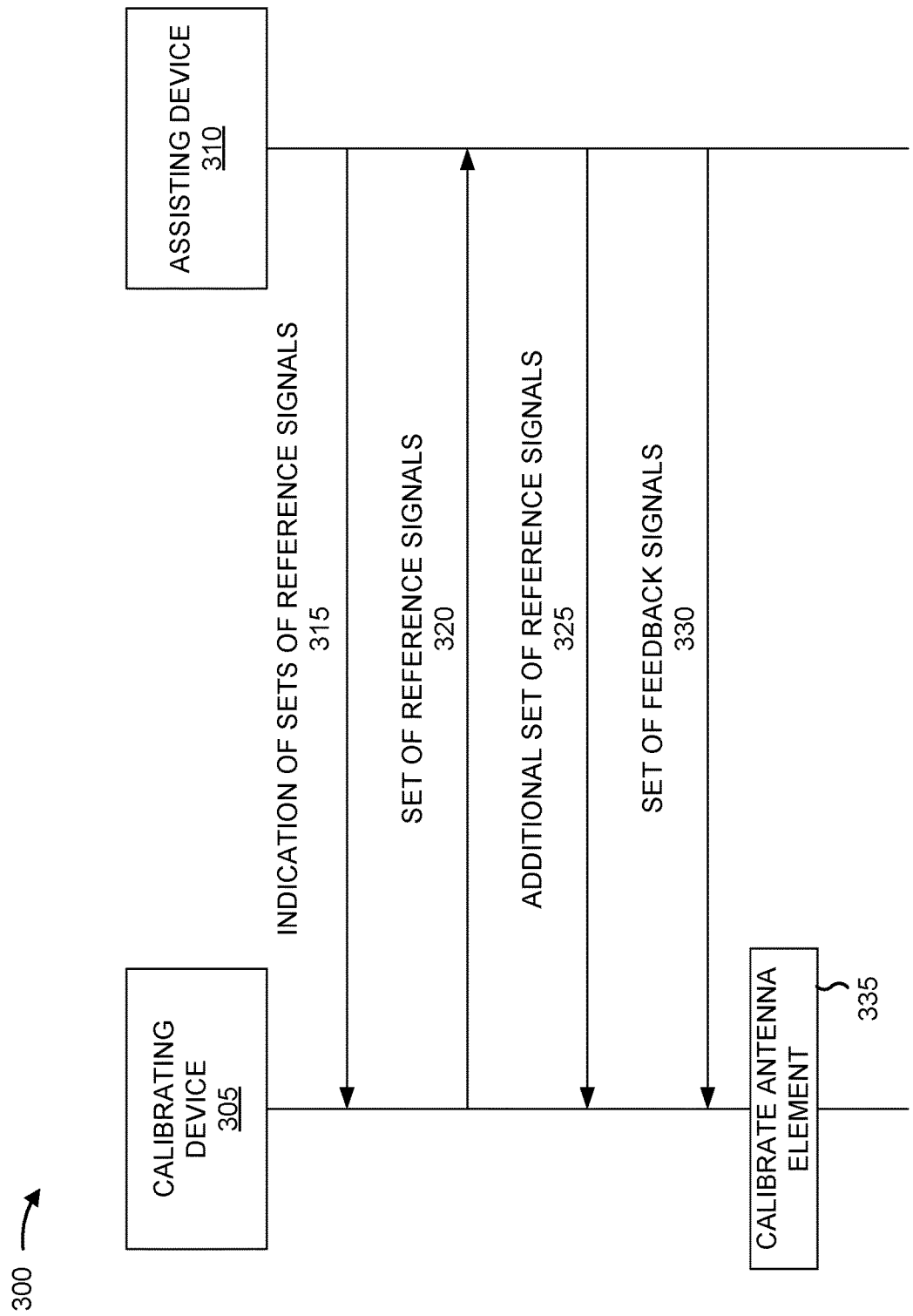
FIGS. 3-5 are diagrams illustrating examples of network assisted antenna calibration, in accordance with the present disclosure.

FIG. 3 is a diagram illustrating an example 300 of network assisted antenna calibration, in accordance with the present disclosure. As shown, a calibrating device 305 and an assisting device 310 may communicate with one another.

In some aspects, the calibrating device 305 may include a UE or a CPE and the assisting device may include a base station or an integrated access and backhaul (IAB) node. In some aspects, the calibrating device 305 may include a base station or an IAB node and the assisting device 310 may include a UE or a CPE. In some aspects, the base station or IAB node may select the UE or CPE from a set of UEs or CPEs based at least in part on a channel condition, a rate requirement, a power condition, a thermal condition, a capability, and/or the like.

As shown by reference number 315, the assisting device 310 may transmit, and the calibrating device 305 may receive, an indication of one or more sets of reference signals. In some aspects, the indication may indicate a set of reference signals that the assisting device 310 will transmit to the calibrating device 305, a set of reference signals that the calibrating device 305 will transmit to the assisting device 310, and/or the like.

As shown by reference number 320, the calibrating device 305 may transmit, and the assisting device 310 may receive, a set of reference signals. In some aspects, the set of reference signals may include a sounding reference signal (SRS), a channel state information reference signal (CSI-RS), a calibration-specific reference signal, and/or the like. In some aspects, the set of reference signals may be transmitted based at least in part on an analog beamforming codebook having a size that satisfies a threshold codebook size. In some aspects, the set of reference signals may be transmitted using one or more frequency resources associated with a millimeter wave (mmW) carrier frequency. In some aspects, a frequency of the mmW carrier frequency may be greater than 24.25 gigahertz (GHz).

As shown by reference number 325, the assisting device 310 may transmit, and the calibrating device 305 may receive, an additional set of reference signals. In some aspects, the additional set of reference signals may be to facilitate calibration of at least one antenna element on at least one panel associated with the calibrating device 305. In some aspects, the additional set of reference signals may include an SRS, a CSI-RS, a calibration-specific reference signal, and/or the like. In some aspects, the additional set of reference signals may be transmitted based at least in part on an analog beamforming codebook having a size that satisfies a threshold codebook size. In some aspects, the additional set of reference signals may be transmitted using one or more frequency resources associated with a mmW carrier frequency.

As shown by reference number 330, the assisting device 310 may transmit, and the calibrating device 305 may receive, a set of feedback signals corresponding to the set of reference signals. In some aspects, the set of feedback signals may be to facilitate calibration of the at least one antenna element on the at least one panel associated with the calibrating device 305. In some aspects, the set of feedback signals may be transmitted using one or more frequency resources associated with a mmW carrier frequency.

In some aspects, the set of feedback signals may include a set of processed reference signals generated based at least in part on processing of the set of reference signals through a receive (Rx) chain of the assisting device 310 and a transmit (Tx) chain of the assisting device 310, an indication of the set of reference signals, one or more characteristics of the set of reference signals, and/or the like. For example, the set of reference signals may be processed using beamforming to generate feedback that indicates a post-beamformed phase and amplitude. The feedback signals, therefore, may include multiple sets of post-beamformed complex channel impulse responses with different beamforming weights used over these signals. In some aspects, the set of feedback signals may be based at least in part on an analog beamforming codebook having a size that satisfies a threshold codebook size.

As shown by reference number 335, the calibrating device 305 may calibrate at least one antenna element of at least one panel. In some aspects, the calibrating device 305 may calibrate a phase or an amplitude of the at least one antenna element on the at least one panel based at least in part on the set of feedback signals. In some aspects, calibrating the at least one antenna element on the at least one panel may be based at least in part on a particular frequency of operation. In some aspects, for example, calibrating the at least one antenna element may include applying a post-beamformed amplitude (indicated by a feedback signal), as well as reversing a phase indicated by the feedback signal and applying the reversed phase to the at least one antenna element.

In some aspects, the assisted calibration procedure shown in FIG. 3 may be initiated based at least in part on detection of occurrence of a calibration trigger event. In some aspects, the calibrating device 305 may detect the occurrence of the calibration trigger event. In some aspects, the assisting device 310 may detect the occurrence of the calibration trigger event. The calibration trigger event may include a temperature of the calibrating device 305 (or a component thereof) satisfying a temperature threshold, reception of a resource allocation corresponding to a frequency resource that satisfies a frequency condition, and/or the like.

As indicated above, FIG. 3 is provided as an example. Other examples may differ from what is described with regard to FIG. 3.

Figure 4:
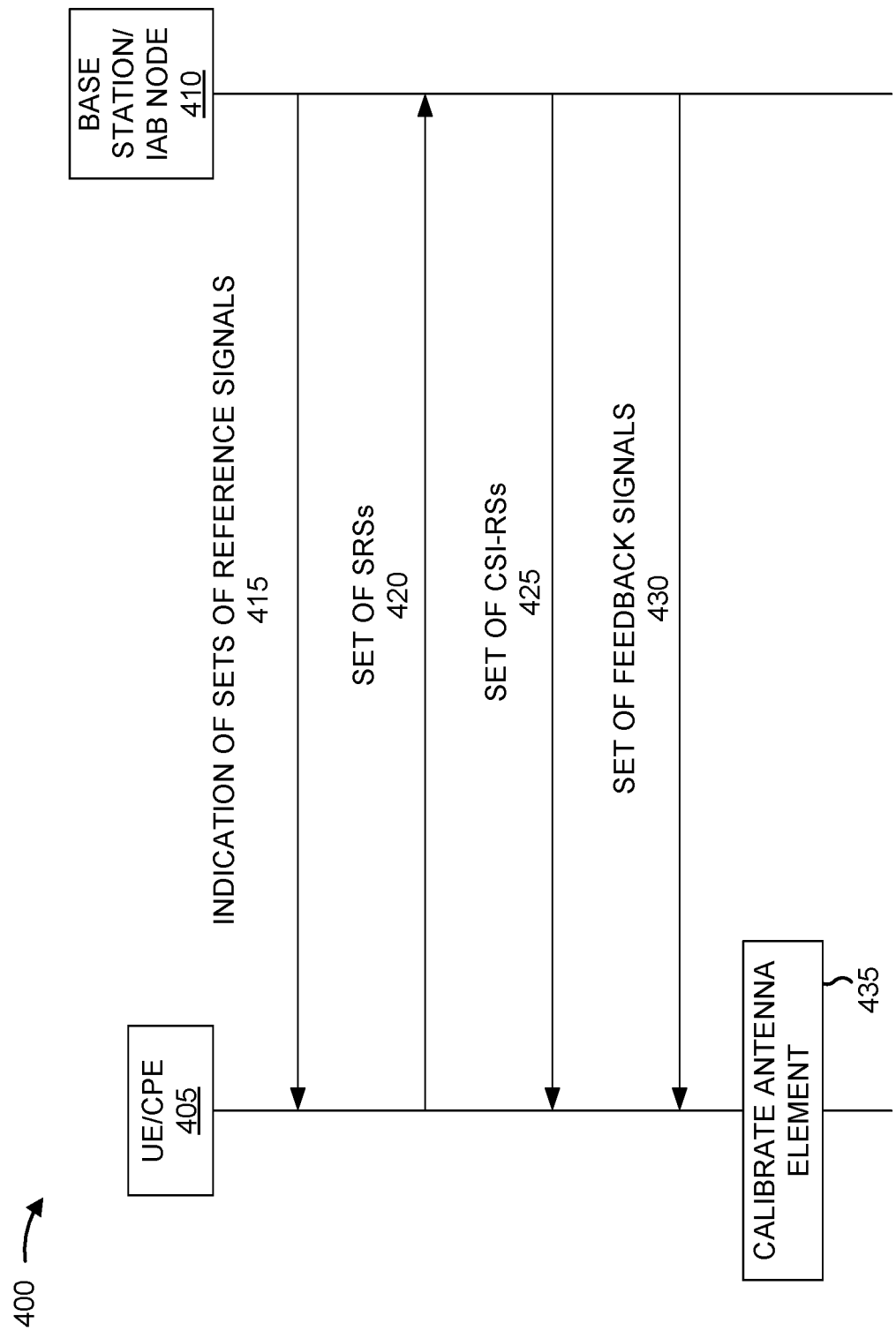

FIG. 4 is a diagram illustrating an example 400 of network assisted antenna calibration, in accordance with the present disclosure. As shown, a UE or a CPE (shown as UE/CPE) 405 and a base station or an IAB node (shown as base station/IAB node) 410 may communication with one another.

As shown by reference number 415, the base station/IAB node 410 may transmit, and the UE/CPE 405 may receive, an indication of one or more sets of reference signals. In some aspects, the indication may indicate a set of reference signals that the base station/IAB node 410 will transmit to the UE/CPE 405, a set of reference signals that the UE/CPE 405 will transmit to the base station/IAB node 410, and/or the like. In some aspects, the indication may indicate resources associated with the one or more sets of reference signals.

As shown by reference number 420, the UE/CPE 405 may transmit, and the base station/IAB node 410 may receive, a set of reference signals. In some aspects, as shown, the set of reference signals may include a set of SRSs. In some aspects, the set of reference signals may include a CSI-RS, a calibration-specific reference signal, and/or the like.

As shown by reference number 425, the base station/IAB node 410 may transmit, and the UE/CPE 405 may receive, an additional set of reference signals. In some aspects, the additional set of reference signals may be to facilitate calibration of at least one antenna element on at least one panel associated with the UE/CPE 405. In some aspects, as shown the additional set of reference signals may include a set of CSI-RSs. In some aspects, the additional set of reference signals may include an SRS, a calibration-specific reference signal, and/or the like.

As shown by reference number 430, the base station/IAB node 410 may transmit, and the UE/CPE 405 may receive, a set of feedback signals corresponding to the set of reference signals. In some aspects, the set of feedback signals may be to facilitate calibration of the at least one antenna element on the at least one panel associated with the UE/CPE 405. As shown by reference number 435, UE/CPE 405 may calibrate at least one antenna element of at least one panel based at least in part on the set of feedback signals, the additional set of reference signals, and/or the like.

As indicated above, FIG. 4 is provided as an example. Other examples may differ from what is described with regard to FIG. 4.

Figure 5:
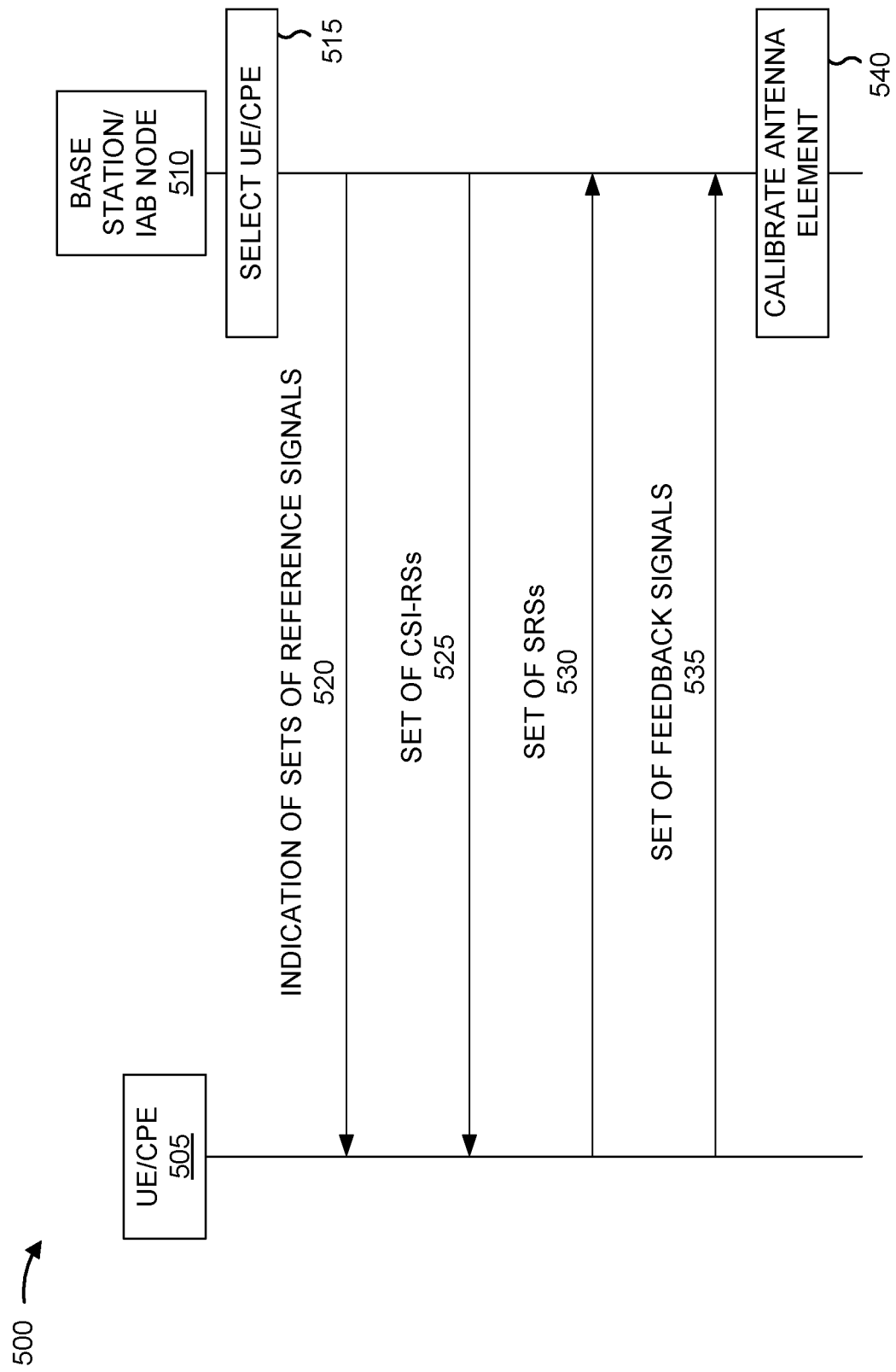

FIG. 5 is a diagram illustrating an example 500 of network assisted antenna calibration, in accordance with the present disclosure. As shown, a UE or a CPE (shown as UE/CPE) 505 and a base station or an IAB node (shown as base station/IAB node) 510 may communication with one another.

As shown by reference number 515, the base station/IAB node 510 may select the UE/CPE 505 from a set of UEs and/or CPEs. In some aspects, the set of UEs and/or CPEs may include UEs and/or CPEs in communication with the base station/IAB node 510. In some aspects, the base station/IAB node 510 may select the UE/CPE 505 based at least in part on a channel condition, a rate requirement for the UE/CPE 505, a power condition, a thermal condition, a capability of the UE/CPE 505, a physical location condition (e.g., whether the UE/CPE 505 is located at or near a cell edge, a cell center, and/or the like), and/or the like.

As shown by reference number 520, the base station/IAB node 510 may transmit, and the UE/CPE 505 may receive, an indication of one or more sets of reference signals. In some aspects, the indication may indicate a set of reference signals that the base station/IAB node 510 will transmit to the UE/CPE 505, a set of reference signals that the UE/CPE 505 will transmit to the base station/IAB node 510, and/or the like. In some aspects, the indication may indicate resources associated with the one or more sets of reference signals.

As shown by reference number 525, the base station/IAB node 510 may transmit, and the UE/CPE 505 may receive, a set of reference signals. In some aspects, as shown, the set of reference signals may include a set of CSI-RSs. In some aspects, the set of reference signals may include an SRS, a calibration-specific reference signal, and/or the like.

As shown by reference number 530, the UE/CPE 505 may transmit, and the base station/IAB node 510 may receive, an additional set of reference signals. In some aspects, the additional set of reference signals may be to facilitate calibration of at least one antenna element on at least one panel associated with the base station/IAB node 510. In some aspects, as shown, the additional set of reference signals may include a set of SRSs. In some aspects, the additional set of reference signals may include a CSI-RS, a calibration-specific reference signal, and/or the like.

As shown by reference number 535, the UE/CPE 505 may transmit, and the base station/IAB node 510 may receive, a set of feedback signals corresponding to the set of reference signals. In some aspects, the set of feedback signals may be to facilitate calibration of the at least one antenna element on the at least one panel associated with the base station/IAB node 510. As shown by reference number 540, base station/IAB node 510 may calibrate at least one antenna element of at least one panel based at least in part on the set of feedback signals, the additional set of reference signals, and/or the like.

As indicated above, FIG. 5 is provided as an example. Other examples may differ from what is described with regard to FIG. 5.

Figure 6:
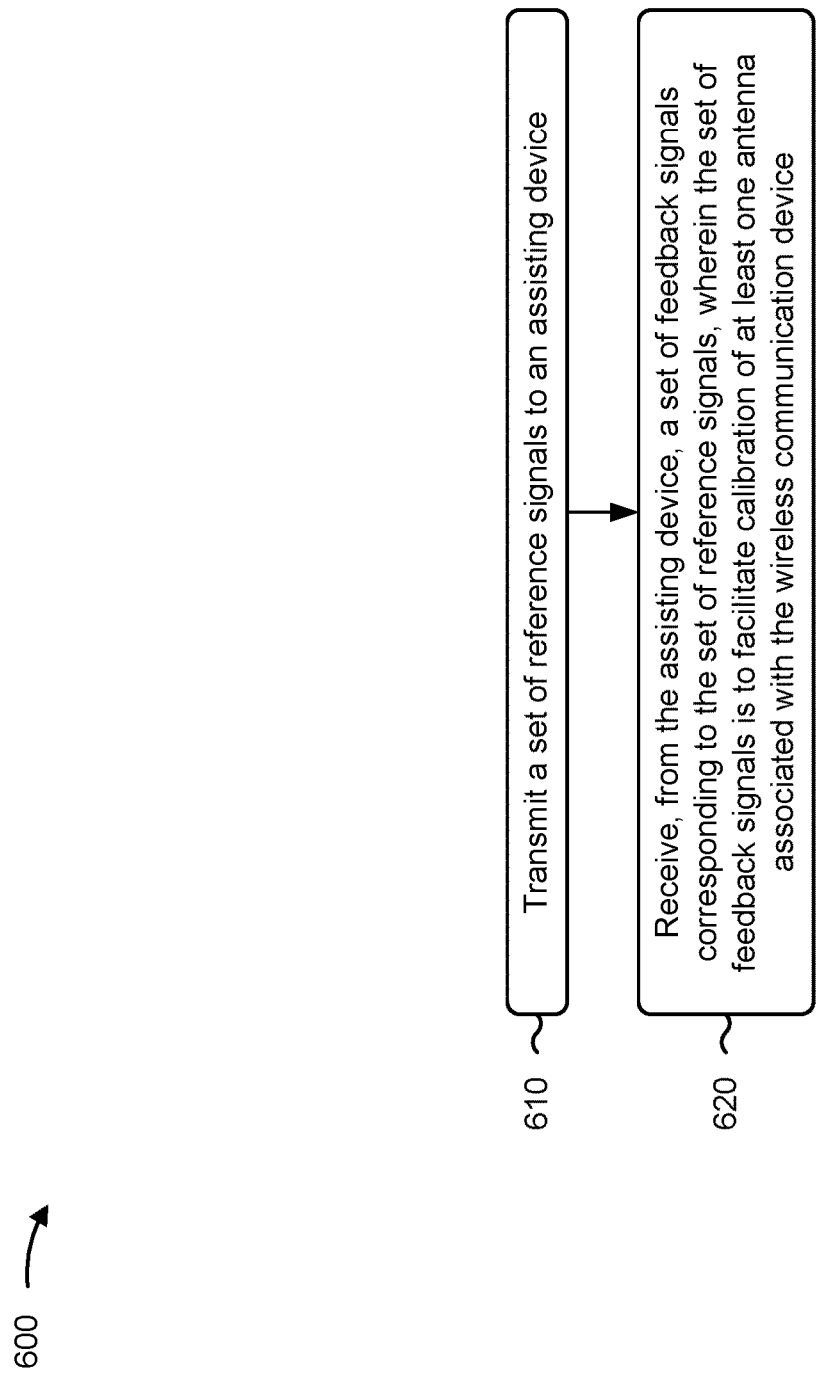

FIG. 6 is a diagram illustrating an example process 600 performed, for example, by a wireless communication device, in accordance with the present disclosure. Example process 600 is an example where the wireless communication device (e.g., base station 110, UE 120, a CPE, an IAB node, and/or the like) performs operations associated with network assisted antenna calibration.

As shown in FIG. 6, in some aspects, process 600 may include transmitting a set of reference signals to an assisting device (block 610). For example, the wireless communication device (e.g., using transmit processor 220, transmit processor 264, controller/processor 240, controller/processor 280, memory 242, memory 282, and/or the like) may transmit a set of reference signals to an assisting device, as described above, for example, with reference to FIGS. 3, 4, and/or 5.

As further shown in FIG. 6, in some aspects, process 600 may include receiving, from the assisting device, a set of feedback signals corresponding to the set of reference signals, wherein the set of feedback signals is to facilitate calibration of at least one antenna element on at least one panel associated with the wireless communication device (block 620). For example, the wireless communication device (e.g., using receive processor 238, receive processor 258, controller/processor 240, controller/processor 280, memory 242, memory 282, and/or the like) may receive, from the assisting device, a set of feedback signals corresponding to the set of reference signals, as described above, for example, with reference to FIGS. 3, 4, and/or 5. In some aspects, the set of feedback signals is to facilitate calibration of at least one antenna element on at least one panel associated with the wireless communication device.

Process 600 may include additional aspects, such as any single aspect or any combination of aspects described below and/or in connection with one or more other processes described elsewhere herein.

In a first aspect, process 600 includes calibrating a phase or an amplitude of the at least one antenna element on the at least one panel based at least in part on the set of feedback signals.

In a second aspect, alone or in combination with the first aspect, process 600 includes detecting occurrence of a calibration trigger event, where calibrating the at least one antenna element on the at least one panel is based at least in part on detecting the occurrence of the calibration trigger event.

In a third aspect, alone or in combination with one or more of the first and second aspects, the calibration trigger event comprises at least one of a temperature of the wireless communication device satisfying a temperature threshold, reception of a resource allocation corresponding to a frequency resource that satisfies a frequency condition, or a combination thereof.

In a fourth aspect, alone or in combination with one or more of the first through third aspects, calibrating the at least one antenna element on the at least one panel is based at least in part on a particular frequency of operation.

In a fifth aspect, alone or in combination with one or more of the first through fourth aspects, process 600 includes providing an indication of the set of reference signals to the assisting device.

In a sixth aspect, alone or in combination with one or more of the first through fifth aspects, process 600 includes receiving an additional set of reference signals from the assisting device, wherein the additional set of reference signals is to facilitate calibration of the at least one antenna element on the at least one panel associated with the wireless communication device.

In a seventh aspect, alone or in combination with one or more of the first through sixth aspects, process 600 includes receiving, from the assisting device, an indication of at least one of the set of reference signals, the additional set of reference signals, or a combination thereof, where transmitting the set of reference signals to the assisting device is based at least in part on the indication.

In an eighth aspect, alone or in combination with one or more of the first through seventh aspects, process 600 includes providing an indication of the additional set of reference signals to the assisting device.

In a ninth aspect, alone or in combination with one or more of the first through eighth aspects, the set of reference signals comprises an SRS, a CSI-RS, or a calibration-specific reference signal.

In a tenth aspect, alone or in combination with one or more of the first through ninth aspects, the set of feedback signals comprises at least one of a set of processed reference signals generated based at least in part on processing of the set of reference signals through an Rx chain of the assisting device and a Tx chain of the assisting device, an indication of the set of reference signals, one or more characteristics of the set of reference signals, or a combination thereof.

In an eleventh aspect, alone or in combination with one or more of the first through tenth aspects, the wireless communication device comprises a UE or a CPE and the assisting device comprises a base station or an IAB node.

In a twelfth aspect, alone or in combination with one or more of the first through eleventh aspects, the wireless communication device comprises a base station or an IAB node, and the assisting device comprises a UE or a CPE.

In a thirteenth aspect, alone or in combination with one or more of the first through twelfth aspects, the assisting device comprises a UE or a CPE, the wireless communication device comprises a base station or an IAB node, and process 600 includes selecting the UE or CPE from a set of UEs or CPEs.

In a fourteenth aspect, alone or in combination with one or more of the first through thirteenth aspects, the base station or IAB node selects the UE or CPE from the set of UEs or CPEs based at least in part on at least one of a channel condition, a rate requirement, a power condition, a thermal condition, a UE/CPE capability, a physical location condition, or a combination thereof.

In a fifteenth aspect, alone or in combination with one or more of the first through fourteenth aspects, the set of reference signals are transmitted based at least in part on an analog beamforming codebook having a size that satisfies a threshold codebook size.

In a sixteenth aspect, alone or in combination with one or more of the first through fifteenth aspects, the set of feedback signals are based at least in part on an analog beamforming codebook having a size that satisfies a threshold codebook size.

In a seventeenth aspect, alone or in combination with one or more of the first through sixteenth aspects, the set of reference signals are transmitted using one or more frequency resources associated with a mmW carrier frequency.

In an eighteenth aspect, alone or in combination with one or more of the first through seventeenth aspects, a frequency of the mmW carrier frequency is greater than 24.25 GHz.

In a nineteenth aspect, alone or in combination with one or more of the first through eighteenth aspects, the set of feedback signals are transmitted using one or more frequency resources associated with a mmW carrier frequency.

In a twentieth aspect, alone or in combination with one or more of the first through nineteenth aspects, a frequency of the mmW carrier frequency is greater than 24.25 GHz.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a wireless communication device, in accordance with the present disclosure. Example process 700 is an example where the wireless communication device (e.g., base station 110, UE 120, a CPE, an IAB node, and/or the like) performs operations associated with network assisted antenna calibration.

As shown in FIG. 7, in some aspects, process 700 may include receiving, from a calibrating device, a set of reference signals (block 710). For example, the wireless communication device (e.g., using receive processor 238, receive processor 258, controller/processor 240, controller/processor 280, memory 242, memory 282, and/or the like) may receive, from a calibrating device, a set of reference signals, as described above, for example, with reference to FIGS. 3, 4, and/or 5.

As further shown in FIG. 7, in some aspects, process 700 may include transmitting, to the calibrating device, a set of feedback signals corresponding to the set of reference signals, wherein the set of feedback signals is to facilitate calibration of at least one antenna element on at least one panel associated with the calibrating device (block 720). For example, the wireless communication device (e.g., using transmit processor 220, transmit processor 264, controller/processor 240, controller/processor 280, memory 242, memory 282, and/or the like) may transmit, to the calibrating device, a set of feedback signals corresponding to the set of reference signals, as described above, for example, with reference to FIGS. 3, 4, and/or 5. In some aspects, the set of feedback signals is to facilitate calibration of at least one antenna element on at least one panel associated with the calibrating device.

Process 700 may include additional aspects, such as any single aspect or any combination of aspects described below and/or in connection with one or more other processes described elsewhere herein.

In a first aspect, the set of feedback signals is to facilitate calibrating a phase or an amplitude of the at least one antenna element on the at least one panel based at least in part on the set of feedback signals.

In a second aspect, alone or in combination with the first aspect, the calibration of the at least one antenna element on the at least one panel is based at least in part on detection of an occurrence of a calibration trigger event.

In a third aspect, alone or in combination with one or more of the first and second aspects, the calibration trigger event comprises at least one of a temperature of the calibrating device satisfying a temperature threshold, reception of a resource allocation corresponding to a frequency resource that satisfies a frequency condition, or a combination thereof.

In a fourth aspect, alone or in combination with one or more of the first through third aspects, the calibration of the at least one antenna element on the at least one panel is based at least in part on a particular frequency of operation.

In a fifth aspect, alone or in combination with one or more of the first through fourth aspects, process 700 includes receiving an indication of the set of reference signals from the calibrating device.

In a sixth aspect, alone or in combination with one or more of the first through fifth aspects, process 700 includes transmitting an additional set of reference signals to the calibrating device, wherein the additional set of reference signals is to facilitate calibration of the at least one antenna element on the at least one panel associated with the calibrating device.

In a seventh aspect, alone or in combination with one or more of the first through sixth aspects, process 700 includes transmitting, to the calibrating device, an indication of at least one of the set of reference signals, the additional set of reference signals, or a combination thereof, where receiving the set of reference signals from the calibrating device is based at least in part on the indication.

In an eighth aspect, alone or in combination with one or more of the first through seventh aspects, process 700 includes receiving an indication of the additional set of reference signals from the calibrating device.

In a ninth aspect, alone or in combination with one or more of the first through eighth aspects, the set of reference signals comprises an SRS, a CSI-RS, or a calibration-specific reference signal.

In a tenth aspect, alone or in combination with one or more of the first through ninth aspects, the set of feedback signals comprises at least one of: a set of processed reference signals generated based at least in part on processing of the set of reference signals through a Rx chain of the wireless communication device and a Tx chain of the wireless communication device, an indication of the set of reference signals, one or more characteristics of the set of reference signals, or a combination thereof.

In an eleventh aspect, alone or in combination with one or more of the first through tenth aspects, the calibrating device comprises a UE or a CPE and the wireless communication device comprises a base station or an IAB node.

In a twelfth aspect, alone or in combination with one or more of the first through eleventh aspects, the calibrating device comprises a base station or an IAB node, and the wireless communication device comprises a UE or a CPE.

In a thirteenth aspect, alone or in combination with one or more of the first through twelfth aspects, the set of reference signals are received based at least in part on an analog beamforming codebook having a size that satisfies a threshold codebook size.

In a fourteenth aspect, alone or in combination with one or more of the first through thirteenth aspects, the set of feedback signals are based at least in part on an analog beamforming codebook having a size that satisfies a threshold codebook size.

In a fifteenth aspect, alone or in combination with one or more of the first through fourteenth aspects, the set of reference signals are received using one or more frequency resources associated with a mmW carrier frequency.

In a sixteenth aspect, alone or in combination with one or more of the first through fifteenth aspects, a frequency of the mmW carrier frequency is greater than 24.25 GHz.

In a seventeenth aspect, alone or in combination with one or more of the first through sixteenth aspects, the set of feedback signals are received using one or more frequency resources associated with a mmW carrier frequency.

In an eighteenth aspect, alone or in combination with one or more of the first through seventeenth aspects, a frequency of the mmW carrier frequency is greater than 24.25 GHz.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method of wireless communication performed by a wireless communication device, comprising: transmitting a set of reference signals to an assisting device; and receiving, from the assisting device, a set of feedback signals corresponding to the set of reference signals, wherein the set of feedback signals is to facilitate mission-mode calibration of a phase and an amplitude of at least one antenna element on at least one panel associated with the wireless communication device.

Aspect 2: The method of Aspect 1, wherein the set of feedback signals indicate a post-beamformed phase and a post-beamformed amplitude.

Aspect 3: The method of either of Aspects 1 or 2, wherein the set of feedback signals include a set of post-beamformed complex channel impulse responses with different sets of beamforming weights.

Aspect 4: The method of any of Aspects 1-3, further comprising calibrating the phase or the amplitude of the at least one antenna element on the at least one panel based at least in part on the set of feedback signals.

Aspect 5: The method of Aspect 4, further comprising: detecting occurrence of a calibration trigger event, wherein calibrating the at least one antenna element on the at least one panel is based at least in part on detecting the occurrence of the calibration trigger event.

Aspect 6: The method of Aspect 5, wherein the calibration trigger event comprises at least one of: a temperature of the wireless communication device satisfying a temperature threshold, reception of a resource allocation corresponding to a frequency resource that satisfies a frequency condition, or a combination thereof.

Aspect 7: The method of any of Aspects 4-5, wherein calibrating the at least one antenna element on the at least one panel is based at least in part on a particular frequency of operation.

Aspect 8: The method of any of Aspects 1-7, further comprising providing an indication of the set of reference signals to the assisting device.

Aspect 9: The method of any of Aspects 1-8, further comprising receiving an additional set of reference signals from the assisting device, wherein the additional set of reference signals is to facilitate calibration of the at least one antenna element on the at least one panel associated with the wireless communication device.

Aspect 10: The method of Aspect 9, further comprising receiving, from the assisting device, an indication of at least one of: the set of reference signals, the additional set of reference signals, or a combination thereof, wherein transmitting the set of reference signals to the assisting device is based at least in part on the indication.

Aspect 11: The method of either of Aspects 9 or 10, further comprising providing an indication of the additional set of reference signals to the assisting device.

Aspect 12: The method of any of Aspects 1-11, wherein the set of reference signals comprises a sounding reference signal (SRS), a channel state information reference signal (CSI-RS), or a calibration-specific reference signal.

Aspect 13: The method of any of Aspects 1-12, wherein the set of feedback signals comprises at least one of: a set of processed reference signals generated based at least in part on processing of the set of reference signals through a receive (Rx) chain of the assisting device and a transmit (Tx) chain of the assisting device, an indication of the set of reference signals, one or more characteristics of the set of reference signals, or a combination thereof.

Aspect 14: The method of any of Aspects 1-13, wherein the wireless communication device comprises a user equipment (UE) or a customer premises equipment (CPE) and the assisting device comprises a base station or an integrated access and backhaul (IAB) node.

Aspect 15: The method of any of Aspects 1-13, wherein the wireless communication device comprises a base station or an integrated access and backhaul (IAB) node, and the assisting device comprises a user equipment (UE) or a customer premises equipment (CPE).

Aspect 16: The method of any of Aspects 1-13, wherein the assisting device comprises a user equipment (UE) or a customer premises equipment (CPE), and wherein the wireless communication device comprises a base station or an integrated access and backhaul (TAB) node, the method further comprising selecting the UE or CPE from a set of UEs or CPEs.

Aspect 17: The method of Aspect 16, wherein the base station or TAB node selects the UE or CPE from the set of UEs or CPEs based at least in part on at least one of: a channel condition, a rate requirement, a power condition, a thermal condition, a UE/CPE capability, a physical location condition, or a combination thereof.

Aspect 18: The method of any of Aspects 1-17, wherein the set of reference signals are transmitted based at least in part on an analog beamforming codebook having a size that satisfies a threshold codebook size.

Aspect 19: The method of any of Aspects 1-18, wherein the set of feedback signals are based at least in part on an analog beamforming codebook having a size that satisfies a threshold codebook size.

Aspect 20: The method of any of Aspects 1-19, wherein the set of reference signals are transmitted using one or more frequency resources associated with a millimeter wave carrier frequency.

Aspect 21: The method of Aspect 20, wherein a frequency of the millimeter wave carrier frequency is greater than 24.25 gigahertz.

Aspect 22: The method of any of Aspects 1-21, wherein the set of feedback signals are transmitted using one or more frequency resources associated with a millimeter wave carrier frequency.

Aspect 23: The method of Aspect 22, wherein a frequency of the millimeter wave carrier frequency is greater than 24.25 gigahertz.

Aspect 24: A method of wireless communication performed by a wireless communication device, comprising: receiving, from a calibrating device, a set of reference signals; and transmitting, to the calibrating device, a set of feedback signals corresponding to the set of reference signals, wherein the set of feedback signals is to facilitate mission-mode calibration of a phase and an amplitude of at least one antenna element on at least one panel associated with the calibrating device.

Aspect 25: The method of Aspect 24, wherein the set of feedback signals indicate a post-beamformed phase and a post-beamformed amplitude.

Aspect 26: The method of either of Aspects 24 or 25, wherein the set of feedback signals include a post-beamformed complex channel impulse response.

Aspect 27: The method of any of Aspects 24-26, wherein the calibration of the at least one antenna element on the at least one panel is based at least in part on detection of an occurrence of a calibration trigger event.

Aspect 28: The method of Aspect 27, wherein the calibration trigger event comprises at least one of: a temperature of the calibrating device satisfying a temperature threshold, reception, by the calibrating device, of a resource allocation corresponding to a frequency resource that satisfies a frequency condition, or a combination thereof.

Aspect 29: The method of any of Aspects 24-28, wherein the calibration of the at least one antenna element on the at least one panel is based at least in part on a particular frequency of operation.

Aspect 30: The method of any of Aspects 24-29, further comprising receiving an indication of the set of reference signals from the calibrating device.

Aspect 31: The method of any of Aspects 24-30, further comprising transmitting an additional set of reference signals to the calibrating device, wherein the additional set of reference signals is to facilitate calibration of the at least one antenna element on the at least one panel associated with the calibrating device.

Aspect 32: The method of Aspect 31, further comprising transmitting, to the calibrating device, an indication of at least one of: the set of reference signals, the additional set of reference signals, or a combination thereof, wherein receiving the set of reference signals from the calibrating device is based at least in part on the indication.

Aspect 33: The method of Aspect 32, further comprising receiving an indication of the additional set of reference signals from the calibrating device.

Aspect 34: The method of any of Aspects 24-33, wherein the set of reference signals comprises a sounding reference signal (SRS), a channel state information reference signal (CSI-RS), or a calibration-specific reference signal.

Aspect 35: The method of any of Aspects 24-34, wherein the set of feedback signals comprises at least one of: a set of processed reference signals generated based at least in part on processing of the set of reference signals through a receive (Rx) chain of the wireless communication device and a transmit (Tx) chain of the wireless communication device, an indication of the set of reference signals, one or more characteristics of the set of reference signals, or a combination thereof.

Aspect 36: The method of any of Aspects 24-35, wherein the calibrating device comprises a user equipment (UE) or a customer premises equipment (CPE) and the wireless communication device comprises a base station or an integrated access and backhaul (IAB) node.

Aspect 37: The method of any of Aspects 24-35, wherein the calibrating device comprises a base station or an integrated access and backhaul (IAB) node, and the wireless communication device comprises a user equipment (UE) or a customer premises equipment (CPE).

Aspect 38: The method of any of Aspects 24-37, wherein the set of reference signals are received based at least in part on an analog beamforming codebook having a size that satisfies a threshold codebook size.

Aspect 39: The method of any of Aspects 24-38, wherein the set of feedback signals are based at least in part on an analog beamforming codebook having a size that satisfies a threshold codebook size.

Aspect 40: The method of any of Aspects 24-39, wherein the set of reference signals are received using one or more frequency resources associated with a millimeter wave carrier frequency.

Aspect 41: The method of Aspect 40, wherein a frequency of the millimeter wave carrier frequency is greater than 24.25 gigahertz.

Aspect 42: The method of any of Aspects 24-41, wherein the set of feedback signals are received using one or more frequency resources associated with a millimeter wave carrier frequency.

Aspect 43: The method of Aspect 42, wherein a frequency of the millimeter wave carrier frequency is greater than 24.25 gigahertz.

Aspect 44: An apparatus for wireless communication at a device, comprising a processor; memory coupled with the processor; and instructions stored in the memory and executable by the processor to cause the apparatus to perform the method of one or more of Aspects 1-23.

Aspect 45: A device for wireless communication, comprising a memory and one or more processors coupled to the memory, the one or more processors configured to perform the method of one or more of Aspects 1-23.

Aspect 46: An apparatus for wireless communication, comprising at least one means for performing the method of one or more of Aspects 1-23.

Aspect 47: A non-transitory computer-readable medium storing code for wireless communication, the code comprising instructions executable by a processor to perform the method of one or more of Aspects 1-23.

Aspect 48: A non-transitory computer-readable medium storing a set of instructions for wireless communication, the set of instructions comprising one or more instructions that, when executed by one or more processors of a device, cause the device to perform the method of one or more of Aspects 1-23.

Aspect 49: An apparatus for wireless communication at a device, comprising a processor; memory coupled with the processor; and instructions stored in the memory and executable by the processor to cause the apparatus to perform the method of one or more of Aspects 24-43.

Aspect 50: A device for wireless communication, comprising a memory and one or more processors coupled to the memory, the one or more processors configured to perform the method of one or more of Aspects 24-43.

Aspect 51: An apparatus for wireless communication, comprising at least one means for performing the method of one or more of Aspects 24-43.

Aspect 52: A non-transitory computer-readable medium storing code for wireless communication, the code comprising instructions executable by a processor to perform the method of one or more of Aspects 24-43.

Aspect 53: A non-transitory computer-readable medium storing a set of instructions for wireless communication, the set of instructions comprising one or more instructions that, when executed by one or more processors of a device, cause the device to perform the method of one or more of Aspects 24-43.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a wireless communication device, comprising:
   transmitting a set of reference signals to an assisting device; and
   receiving, from the assisting device, a set of feedback signals corresponding to the set of reference signals, wherein the set of feedback signals is to facilitate mission-mode calibration of a phase and an amplitude of at least one antenna element on at least one panel associated with the wireless communication device.

2. The method of claim 1, wherein the set of feedback signals include a set of post-beamformed complex channel impulse responses with different sets of beamforming weights.

3. The method of claim 1, further comprising calibrating the phase or the amplitude of the at least one antenna element on the at least one panel based at least in part on the set of feedback signals.

4. The method of claim 3, further comprising:
   detecting occurrence of a calibration trigger event,
      wherein calibrating the at least one antenna element on the at least one panel is based at least in part on detecting the occurrence of the calibration trigger event.

5. The method of claim 4, wherein the calibration trigger event comprises at least one of:
   a temperature of the wireless communication device satisfying a temperature threshold,
   reception of a resource allocation corresponding to a frequency resource that satisfies a frequency condition, or
   a combination thereof.

6. The method of claim 3, wherein calibrating the at least one antenna element on the at least one panel is based at least in part on a particular frequency of operation.

7. The method of claim 1, wherein the set of reference signals comprises a sounding reference signal (SRS), a channel state information reference signal (CSI-RS), or a calibration-specific reference signal.

8. The method of claim 1, wherein the set of feedback signals comprises at least one of:
   a set of processed reference signals generated based at least in part on processing of the set of reference signals through a receive (Rx) chain of the assisting device and a transmit (Tx) chain of the assisting device,
   an indication of the set of reference signals,
   one or more characteristics of the set of reference signals, or
   a combination thereof.

9. The method of claim 1, wherein the wireless communication device comprises a user equipment (UE) or a customer premises equipment (CPE) and the assisting device comprises a base station or an integrated access and backhaul (IAB) node.

10. The method of claim 1, wherein the wireless communication device comprises a base station or an integrated access and backhaul (IAB) node, and the assisting device comprises a user equipment (UE) or a customer premises equipment (CPE).

11. The method of claim 10, the method further comprising selecting the UE or CPE from a set of UEs or CPEs.

12. The method of claim 1, wherein the set of reference signals or the set of feedback signals are transmitted based at least in part on an analog beamforming codebook having a size that satisfies a threshold codebook size.

13. A method of wireless communication performed by a wireless communication device, comprising:
   receiving, from a calibrating device, a set of reference signals; and
   transmitting, to the calibrating device, a set of feedback signals corresponding to the set of reference signals, wherein the set of feedback signals is to facilitate mission-mode calibration of a phase and an amplitude of at least one antenna element on at least one panel associated with the calibrating device.

14. The method of claim 13, wherein the set of feedback signals include a post-beamformed complex channel impulse response.

15. The method of claim 13, wherein the calibration of the at least one antenna element on the at least one panel is based at least in part on detection of an occurrence of a calibration trigger event.

16. The method of claim 15, wherein the calibration trigger event comprises at least one of:
   a temperature of the calibrating device satisfying a temperature threshold,
   reception, by the calibrating device, of a resource allocation corresponding to a frequency resource that satisfies a frequency condition, or
   a combination thereof.

17. The method of claim 13, wherein the calibration of the at least one antenna element on the at least one panel is based at least in part on a particular frequency of operation.

18. The method of claim 13, wherein the set of reference signals comprises a sounding reference signal (SRS), a channel state information reference signal (CSI-RS), or a calibration-specific reference signal.

19. The method of claim 13, wherein the set of feedback signals comprises at least one of:
   a set of processed reference signals generated based at least in part on processing of the set of reference signals through a receive (Rx) chain of the wireless communication device and a transmit (Tx) chain of the wireless communication device,
   an indication of the set of reference signals,
   one or more characteristics of the set of reference signals, or
   a combination thereof.

20. The method of claim 13, wherein the calibrating device comprises a user equipment (UE) or a customer premises equipment (CPE) and the wireless communication device comprises a base station or an integrated access and backhaul (IAB) node.

21. The method of claim 13, wherein the calibrating device comprises a base station or an integrated access and backhaul (IAB) node, and the wireless communication device comprises a user equipment (UE) or a customer premises equipment (CPE).

22. The method of claim 13, wherein the set of reference signals are transmitted, or the set of feedback signals are received, based at least in part on an analog beamforming codebook having a size that satisfies a threshold codebook size.

23. A wireless communication device for wireless communication, comprising:
a memory;
a transceiver; and
one or more processors, coupled to the memory and to the transceiver, configured to:
transmit, via the transceiver, a set of reference signals to an assisting device; and
receive, via the transceiver, from the assisting device, a set of feedback signals corresponding to the set of reference signals, wherein the set of feedback signals is to facilitate mission-mode calibration of a phase and an amplitude of at least one antenna element on at least one panel associated with the wireless communication device.

24. The wireless communication device of claim 23, wherein the set of feedback signals include a post-beamformed complex channel impulse response.

25. The wireless communication device of claim 23, wherein the one or more processors are further configured to calibrate the phase or the amplitude of the at least one antenna element on the at least one panel based at least in part on the set of feedback signals.

26. The wireless communication device of claim 25, wherein the one or more processors are further configured to:
detect occurrence of a calibration trigger event,
wherein calibrating the at least one antenna element on the at least one panel is based at least in part on detecting the occurrence of the calibration trigger event.

27. The wireless communication device of claim 23, wherein the wireless communication device comprises a base station or an integrated access and backhaul (IAB) node, and the assisting device comprises a user equipment (UE) or a customer premises equipment (CPE), wherein the one or more processors are further configured to select the UE or CPE from a set of UEs or CPEs.

28. A wireless communication device for wireless communication, comprising:
a memory;
a transceiver; and
one or more processors, coupled to the memory and to the transceiver, configured to:
receive, via the transceiver, from a calibrating device, a set of reference signals; and
transmit, via the transceiver, to the calibrating device, a set of feedback signals corresponding to the set of reference signals, wherein the set of feedback signals is to facilitate mission-mode calibration of a phase and an amplitude of at least one antenna element on at least one panel associated with the calibrating device.

29. The wireless communication device of claim 28, wherein the set of reference signals comprises a sounding reference signal (SRS), a channel state information reference signal (CSI-RS), or a calibration-specific reference signal.

30. The wireless communication device of claim 28, wherein the set of reference signals are transmitted, or the set of feedback signals are received, based at least in part on an analog beamforming codebook having a size that satisfies a threshold codebook size.

* * * * *